US007130924B2

(12) United States Patent
Bartlett et al.

(10) Patent No.: US 7,130,924 B2
(45) Date of Patent: *Oct. 31, 2006

(54) SYSTEM AND METHOD FOR SYNCHRONIZING COPIES OF DATA IN A COMPUTER SYSTEM

(75) Inventors: James Bartlett, Arlington, TX (US); John Kerulis, Little Elm, TX (US); Robert Ngan, Chicago, IL (US); Jay Rasmussen, Coppell, TX (US); Brian Rittenhouse, Frisco, TX (US)

(73) Assignee: Computer Sciences Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/243,461

(22) Filed: Oct. 4, 2005

(65) Prior Publication Data
US 2006/0090045 A1   Apr. 27, 2006

Related U.S. Application Data

(63) Continuation of application No. 09/345,698, filed on Jun. 30, 1999, now Pat. No. 6,952,741.

(51) Int. Cl.
*G06F 15/16* (2006.01)
*G06F 12/00* (2006.01)
(52) U.S. Cl. ............... 709/245; 711/100; 711/118; 711/154; 709/248
(58) Field of Classification Search ............... 711/100, 711/118, 144, 154; 709/245, 248
See application file for complete search history.

(56) References Cited

U.S. PATENT DOCUMENTS

| 6,335,927 B1 * | 1/2002 | Elliott et al. ............... 370/352 |
| 6,731,625 B1 * | 5/2004 | Eastep et al. ............... 370/352 |
| 6,754,181 B1 * | 6/2004 | Elliott et al. ............... 370/252 |
| 6,909,708 B1 * | 6/2005 | Krishnaswamy et al. ... 370/352 |

* cited by examiner

*Primary Examiner*—Tuan V. Thai
(74) *Attorney, Agent, or Firm*—Meyertons, Hood, Kivlin, Kowert & Goetzel, P.C.; Eric B. Meyertons

(57) ABSTRACT

An improved synchronization system and method for copies of data in a computer system. The computer system comprises a cluster, wherein each computer in the cluster may store a local copy of a data set along with a validity flag for the local copy. The computer system further comprises a coupling system which is connected to each of the computers in the cluster through a coupling system interface program, wherein the coupling system is configured to coordinate the data sharing and workload of the cluster. The computer system also comprises an external data storage shared by the computers in the cluster. One of the computers may read a first copy of the data set from a primary data set on the external data storage. The computer may then store the first copy locally and set a first validity flag to indicate that the first copy is valid. Another computer, server, or application program may make a second copy of the primary data set and set a second validity flag to valid. If the first copy is modified, then the second validity flag is set to invalid. The second copy may then be replaced with the modified copy, and the second validity flag may be set to valid again. A coupling system interface program may comprise an application programming interface for data synchronization, wherein the application programming interface is accessible by a plurality of application programs.

20 Claims, 14 Drawing Sheets

SYSTEM AND METHOD FOR SYNCHRONIZING COPIES OF DATA IN A COMPUTER SYSTEM

PRIORITY CLAIM

This application is a continuation application of U.S. patent application Ser. No. 09/345,698, entitled "SYSTEM AND METHOD FOR SYNCHRONIZING COPIES OF DATA IN A COMPUTER SYSTEM" filed on Jun. 30, 1999 now U.S. Pat. No. 6,952,741.

BACKGROUND OF THE INVENTION

1. Field of the Invention

The present invention generally relates to the synchronization of multiple copies of data in a computer system. More particularly, the present invention relates to the synchronization of copies of data stored on several computer systems linked together in a cluster.

2. Description of the Related Art

In a computer program that accesses various forms of data stored on disk or other non-volatile memory, it is often advantageous to store copies of high use data in volatile memory. Accessing data from volatile memory is typically much faster than accessing data from non-volatile memory. The process of storing high use data in volatile memory is commonly called caching.

Large-scale computer applications such as transactional applications used in the financial industry often make use of caching for performance reasons. As used herein, a "transaction" is a series of instructions executed by a computer system for carrying out a financial operation. A transaction may include multiple steps. Examples of transactions include, but are not limited to, financial transactions such as deposits, withdrawals, and funds transfers between accounts. These large-scale applications have increasingly demanded more processing power. Early mainframe computer systems typically contained one processor, one volatile memory, and arrays of non-volatile memory such as disk and tape. Later, multiple-processor systems were introduced which provide a significant performance boost over single-processor systems.

One type of multiple-processor system is a Symmetric Multiprocessor system (SMP). An SMP comprises a set of processors that shares a number of common components, including volatile memory. SMPs offer significant performance advantages over single-CPU systems, and SMPs are scalable by adding additional processors. A major disadvantage of SMPs, however, is that significant resources must be dedicated to synchronizing the activities of the processors. A point may be reached at which adding additional processors actually decreases overall performance. Furthermore, in addition to the processing and scalability limitations, multiple-processor systems share a weakness with single-processor systems: when the system experiences planned or unplanned downtime, the processing services provided by the system are unavailable.

The demand for processing performance and scalability greater than that provided by multiple-processor systems and the demand for increased availability led to the development of clusters. In general, a cluster is a group of servers that can share resources and cooperate in processing.

Clusters may be categorized into three general types. The first type is a high-availability cluster. In a high-availability cluster, one server is typically the primary server and a second server is typically the backup server. If the primary server becomes unavailable due to failure or other reasons, processing is transferred to the backup server. In order to provide as seamless a transition as possible, the backup server is commonly kept in an idle state, negatively impacting the price-performance ratio of the system. High-availability clusters increase the availability of computing resources, but they do not provide significantly greater performance than earlier systems.

A second cluster type is the parallel cluster. Parallel clusters include two or more servers that share some resources; work may be split among the servers and performed in parallel. The servers in the cluster appear as multiple logical systems to the client. During processing, programs and data may be partitioned among the servers. The partitioning of program workload and data among the servers is difficult to manage. No single server has access to all of the data. Adding additional servers to the cluster requires repartitioning of the workload and data. Unbalanced workloads or data may overload one or more servers while other servers are underutilized. If a server fails, its workload must be passed to a backup server to maintain availability. This can be detrimental to performance if the backup server has a workload of its own or has a slow access path to the failed server's data.

The third cluster type is the single-system image cluster. The servers in a single-system image cluster appear as one logical system to clients and to application programs running on the cluster, hence the name "single-system." All servers in the cluster have access to all of the data, and any server in the cluster may run any transaction. Copies of a program may run concurrently on several servers in the cluster. The workload may be dynamically distributed among the servers. The single-system image cluster solves the availability and scalability problems and adds a level of stability by the use of redundant systems with no single points of failure. Effectively, the one logical system may be available year-round to clients and application programs without any outages. Hardware and software maintenance and upgrades may be performed without the loss of availability of the cluster and with little or no impact to active programs. The combination of availability, scalability, processing capability, and the logical system image make the single-system image cluster a powerful environment on which to base a large-scale transaction-based enterprise server.

Single-system image clusters typically share external non-volatile data storage, such as disk drives. Databases and other types of data permanently reside on the external storage. The servers, however, do not generally share volatile memory. Each server in the cluster operates in a dedicated local memory space.

As mentioned above, copies of a program may reside on several servers, and the programs may appear as one program to the client. Workload is distributed among the copies of the program. The programs may access shared data from external storage. For performance advantages, each program may cache high-use data in local memory space.

A single-system image cluster may include at least one Coupling Facility (CF) which provides hardware and software support for the cluster's data sharing functions. Typically, a CF may provide data synchronization for proprietary database architectures such as VSAM, IMS, and DB2, but a CF usually does not provide an application programming interface (API) to allow third-party application programs to directly access the data synchronization functions of the CF. Because of the lack of an API, the CF's data synchronization capabilities cannot be easily applied to data architectures other than the a handful of proprietary architectures listed above.

The single-system image cluster may also provide a timer facility to maintain time synchronization among the servers. On a single-system image cluster, several operating system images such as MVS images may be running on at least one computer system. MVS and OS/390 are examples of mainframe operating systems. OS/390 is a newer version of the MVS operating system, and the terms OS/390 and MVS are used interchangeably herein. "MVS image" is used synonymously with "server" herein. Operating systems other than MVS may also run as servers on a single-system image cluster. Each server is allocated its own local memory space. The servers appear as one logical server to a client. Programs may be duplicated in the memory space of several servers. The workload of a program may be divided among several copies of the program running on different servers. The data required by the program is stored on shared non-volatile memory. A copy of the program may cache frequently used portions of the shared data in a local memory space. As in the case with the multiple servers appearing as one logical server, multiple copies of a program running on a single-system image cluster may appear as one logical program to the client.

The caching of copies of data in local memory areas by programs running on servers in a cluster may lead to a problem in a single-system image cluster environment. If copies of a program require the same data, each may cache a copy in local memory. If one copy of the program modifies a local copy of the data and, optionally, the base data on the external storage, copies of the data cached on other servers are no longer concurrent with the modified copy. It is therefore desirable to provide a method of efficient, timely, and reliable synchronization of data in a single-system image cluster environment. It is also desirable to provide an API to the coupling facility to allow software developers to make source code calls to the functions of the coupling facility, and to enforce data synchronization for data architectures other than proprietary datbases.

The problem of data synchronization may also occur in computer systems in general where a program or programs make copies of shared data. Therefore, a solution to the data synchronization problem should preferably be applicable to computer systems in general as well as specifically to single-system image cluster systems.

SUMMARY OF THE INVENTION

The present invention provides various embodiments of an improved method and system for synchronizing copies of data in a computer system. In one embodiment, a program executing on a server maintains a list of data structures wherein one data structure is allocated to each copy of a primary data set that is read into volatile memory by the program, and wherein a data structure may be used to record the validity of a copy of the primary data. The term "validity" as used herein refers to the state of copies of a primary data set in comparison to the primary data set. If a copy of a data set is valid, the copy of the data set is concurrent with the primary data set. If a copy of a data set is invalid, the primary data set has been modified so that the copy of the data set is not concurrent with the primary data set. "Primary data set" is used herein to describe a grouping of data elements that may be stored in a memory medium external to the servers' local memory, and that may be shared among programs running on servers in the cluster. In one embodiment, a primary data set may be a grouping of records extracted from a database stored on disk. In one embodiment, a primary data set may be constructed from multiple sources on a data storage, wherein the data in the data set may not have a one-to-one correspondence to a physical data set in a database. In some embodiments of a database, records of the database may include at least one field including a unique identifier, or key, which is used to identify and locate copies of the records.

As a copy of a primary data set is created, a validity data structure may be assigned to the copy from the list and a field in the data structure may be initialized to indicate the copy is valid. The field may be referred to as a validity flag, and may have two states: valid and invalid. A flag set to valid indicates that the associated copy of the data set is synchronized with other copies of the data set; a flag set to invalid indicates that at least one other copy of the data set has been modified since the associated copy of the data set was last updated. The program may keep track of which data structure in the list is assigned to a copy of the data set. In one embodiment, the list of data structures may be a section of memory wherein each bit of the memory location serves as a validity data structure, and wherein a bit set to "0" may indicate that the copy is valid and a bit set to "1" may indicate that the data copy is invalid. In another embodiment, a data structure may comprise a plurality of bytes wherein each byte serves as a validity data structure. In yet another embodiment, the validity data structure may be a collection of fields, wherein a first field includes a memory address or some other link to the data set copy used by the program to associate the validity flag with the data set copy, and a second field includes the validity flag. In one embodiment, the validity data structure may be internally allocated in the program's memory space. In another embodiment, the validity data structure may exist in memory external to the program. In yet another embodiment, the data structure may be maintained in hardware, such as a set of registers, for example. In one embodiment, when a program modifies a copy of a data set, the primary data set may be replaced with the modified copy. The validity flags of other copies of the data set may then be set to invalid. When a program needs to access a copy of the data set, the associated validity flag may be checked for validity of the data set. If the flag is valid, the second copy of the data set may be accessed directly by the program. If the flag is invalid, the second copy of the data set may be synchronized before access by overwriting with the contents of the primary data set. The program may then set the validity flag for the second data set copy to valid. In one embodiment, one or more distinct primary data sets may be copied by one or more programs. In one embodiment, one list of data structures may be maintained for copies of all distinct data sets. In another embodiment, one list may be maintained for copies of each distinct data set.

In one embodiment, more than one program may be running on the computer system, the programs may be sharing at least one data set, and the validity data structure list may be maintained in memory external to the programs. A synchronization program may perform the management of the synchronization of data sets. The synchronization program may assign a validity data structure to each copy of a data set the programs cache in local memory. When a first program modifies a local copy of a data set, the first program may replace the primary data set with the modified copy and notify the synchronization program that the data set has been modified. The synchronization program may then set the validity flags of all cached copies of the modified data set to invalid. In one embodiment, when a second program requires access to a local cached copy, the second program may directly check the validity flag. In another embodiment, the second program may request the synchronization program to check the status of the validity flag. The synchronization program may then check the validity flag and return the status of the flag to the second program. If the validity flag is invalid, the second program may refresh the local cached copy with the primary data set before using the local cached copy. In one embodiment, the second program may then set the validity flag for the local cached copy to valid. In another embodiment, the second program may notify the synchronization program that the data set copy has been updated, and the synchronization program may then set the associated validity flag to valid.

In one embodiment, the computer system may be a single-image cluster which may include several servers capable of cooperative parallel processing of data. External non-volatile memory may be shared by the servers. A program may be copied to and executed simultaneously on one or more servers. A data synchronization program may perform tasks associated with the synchronization of data sets. In one embodiment, a coupling system configured to manage the synchronization of data may be linked to servers in a cluster. In one embodiment, a coupling system may reside on a computer system dedicated to the coupling system task. In another embodiment, the coupling system may reside as a server on a computer system in the cluster with other servers in the cluster sharing the computer system. In some embodiments, a cluster may include more than one coupling system. In one embodiment, a synchronization program cooperate with a coupling system to manage the synchronization of data among programs running on servers in the cluster. A synchronization program may act as an interface to a coupling system for programs running on a server. In one embodiment, the synchronization program may include an application programming interface that includes source code level functions that can may be called from the source code of other programs. The functions may allow programs to request the coupling system and coupling system interface to perform data synchronization tasks. In one embodiment, a synchronization program may reside on a coupling system. In another embodiment, one copy of a synchronization program may reside on each server in the cluster connected to a coupling system. In yet another embodiment, a copy of a synchronization program may be assigned to each program that is running on a server. In one embodiment, a synchronization program may establish and maintain a communications link with a coupling system. In one embodiment, a validity data structure may exist on each server in the cluster. In another embodiment, a validity data structure may exist on a coupling interface and may be shared among servers in the cluster. In yet another embodiment, a validity data structure may exist on each computer system in the cluster, and may be shared among servers on a computer system.

In one embodiment, a coupling system may include a table of indexes which may be used to keep track of copies of data sets cached on the servers. The index table may contain information describing the data set copies, information useful for locating a data set copy, and information useful for locating a validity flag associated with a data set copy. In one embodiment, a program running on a server may create a copy of a primary data set in local memory. The program may send a message to the synchronization program notifying the synchronization program of the creation of the data set copy. The message may include information describing the data set copy. In one embodiment, the message may include a unique identifier or key extracted from records in the data set. The synchronization program may then forward the message to the coupling facility. The coupling facility may create an entry in an index table for the data set copy. The entry in the index table may include information used to locate the validity flag for the data set copy. In some embodiments, a key passed in the message from the first program may be used in the index data structure to identify the data set copy. The coupling facility may initialize a validity flag to indicate that the data set copy is valid. The coupling facility may then send a message to the synchronization program including information describing the location of the validity flag for the data set copy. The synchronization program may then forward the message to the program, which may store the validity flag location information in memory. The process of programs caching copies of data sets, requesting synchronization of the copies, and of a coupling system assigning validity flags to the copies may be repeated as several programs cache copies of primary data sets in local memory.

At some point, a first program may desire to modify a cached copy of the data set. In one embodiment, the first program may directly check the status of a validity flag assigned to the cached copy. In another embodiment, the first program may send a message requesting the status of the validity flag to the synchronization program, which may then read the status of the validity flag and return the status to the first program. If the validity flag indicates the cached copy is valid, the first program may modify the cached copy directly. The first program may replace the primary data set with the cached copy after modifying the cached copy. The first program may then send a message to the synchronization program indicating that the primary data set has been modified. The message may include information identifying which program made the modification. In one embodiment, the message may include a unique identifier or key read from the records in the data set. The synchronization program may forward the message to the coupling facility. Upon receiving the message, the coupling facility may read the entries in the index table and identify the entries for all copies of the data set currently cached by using the data description included in the entries. In some embodiments, a key included in the message may be used to locate entries in the index table by comparing the key to information stored in the entries. The coupling facility may then use the locations of the validity flags stored with the data descriptions in the entries in the index table to locate and set the validity flags of cached copies of the data set other than the newly modified copy to invalid, indicating that the copies are not concurrent with the primary data set. In one embodiment, the validity flags may be set to invalid simultaneously. In another embodiment, the validity flags may be set to invalid serially.

At some point after validity flags have been set to indicate that cached copies of a data set are invalid, a second program may need to access a cached copy of a data set. The second program may be running on the same server as the first program or on another server in the cluster. The second program may require read only access or it may require write access to modify the cached copy. In one embodiment, a program may directly check the status of a validity flag associated with a cached copy. In another embodiment, a program may send a message requesting the status of a validity flag to a synchronization program, which would then read the status of the flag and return the status to the program. If the validity flag indicates that the cached data is invalid, the second program may replace the cached copy of the data set with the primary data set. In one embodiment, a program may directly set a validity flag for a cached copy to valid. In another embodiment, a program may send a message to a synchronization program indicating that a cached copy has been updated, and the synchronization program may set the associated validity flag to valid.

BRIEF DESCRIPTION OF THE DRAWINGS

FIG. 10b is a continuation of flowchart 10a;

FIG. 12b is a continuation of flowchart 12a;

Figure 1:
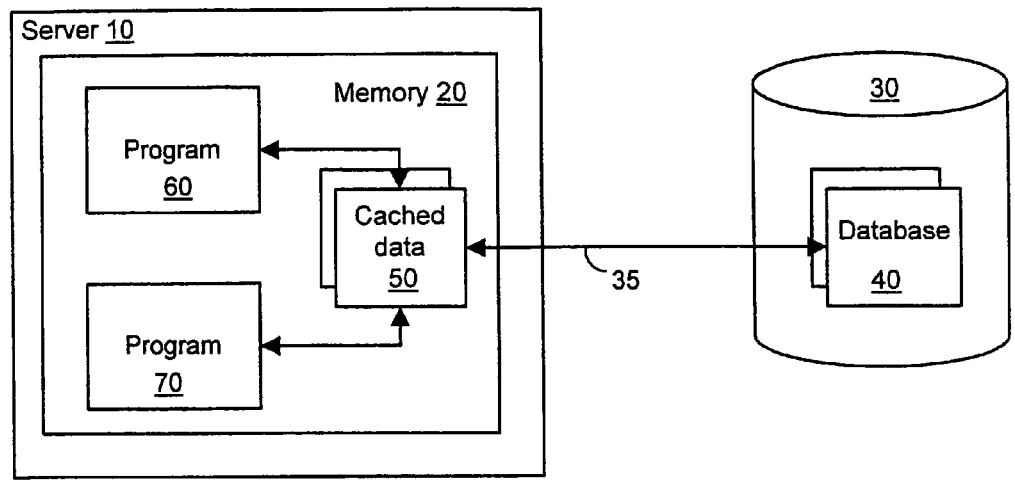
FIG. 1 illustrates a server in which programs share cached data.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

The term "computer system" as used herein generally describes the hardware and software components that in combination allow the execution of computer programs. The computer programs may be stored in software, hardware, or a combination or software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The memory medium may comprise other types of memory or combinations thereof. In addition, the memory medium may be located in a first computer in which the programs are executed, or may be located in a second computer which connects to the first computer over a network. The term "memory" is used synonymously with "memory medium" herein.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A computer system may comprise more than one operating system. When there is more than one operating system, resources such as volatile and non-volatile memory, installation media, and processor time may be shared among the operating systems, or specific resources may be exclusively assigned to an operating system. For example, each operating system may be exclusively allocated a region of volatile memory. The region of volatile memory may be referred to as a "partition" or "memory space." A combination of an operating system and assigned or shared resources on a computer system may be referred to as a "server." A computer system thus may include one or more servers.

FIG. 1—A Server in Which Programs Share Cached Data

FIG. 1 illustrates a server 10 including a memory 20 connected to a data storage 30 by a data bus 35. Server 10 may include a single processor or several processors performing in parallel (processors not shown). A primary copy of a database 40 may be stored on the data storage 30. A program 60 and a program 70, running on server 10, may read a data set from database 40 into memory 20. The data set may be stored in memory 20 as cached data 50. Program 60 and program 70 may share access to cached data 50. If, for example, program 60 modifies cached data 50, then program 70 may immediately see the modification on a subsequent access of cached data 50; there is therefore no need for data synchronization.

Figure 2:
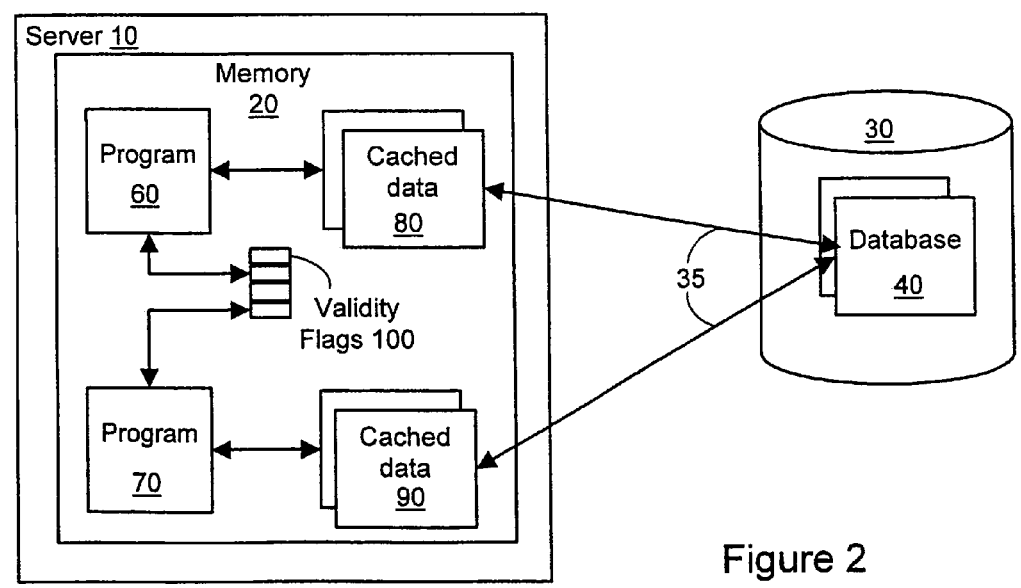
FIG. 2 illustrates a server with programs using local copies of a data set and validity flags according to one embodiment.

FIG. 2—A Server with Programs Using Local Copies of a Data Set and Validity Flags FIG. 2 illustrates one embodiment of a server 10 including memory 20 connected to data storage 30 by a data bus 35. Server 10 may include a single processor or several processors performing in parallel (processors not shown). A list of validity flags 100 may exist on server 10. In one embodiment, validity flags 100 may be provided on another medium, for example on a disk drive or in hardware registers. A primary copy of a database 40 may be stored on data storage 30. A program 60, running on server 10, may read a copy of a primary data set from database 40 into memory 20. The data set may be stored in memory 20 as cached data 80. A validity flag in validity flags 100 may be set to indicate cached data 80 is valid. A program 70, also running on server 10, may read a copy of the same primary data set from database 40 into memory 20. The data set may be stored in memory 20 as cached data 90. A second validity flag in validity flags 100 may be set to indicate cached data 90 is valid. Program 60 may then modify cached data 80, and program 60 may replace the primary data set in database 40 with cached data 80. Program 60 may then search validity flags 100 for validity flags to other copies of cached data 80. Finding the validity flag for cached data 90, program 60 may set the validity flag to invalid to indicate cached data 90 is out of synchronization with cached data 80 and database 40. Prior to accessing cached data 90, program 70 may check the validity flag in validity flags 100 for cached data 90. Finding the flag to be set to invalid, program 70 may then synchronize cached data 90 by reading the primary set from database 40 into cached data 90. Program 70 may then set the flag for cached data 90 in validity flags 100 to valid, indicating that cached data 90 is synchronized.

Figure 3:
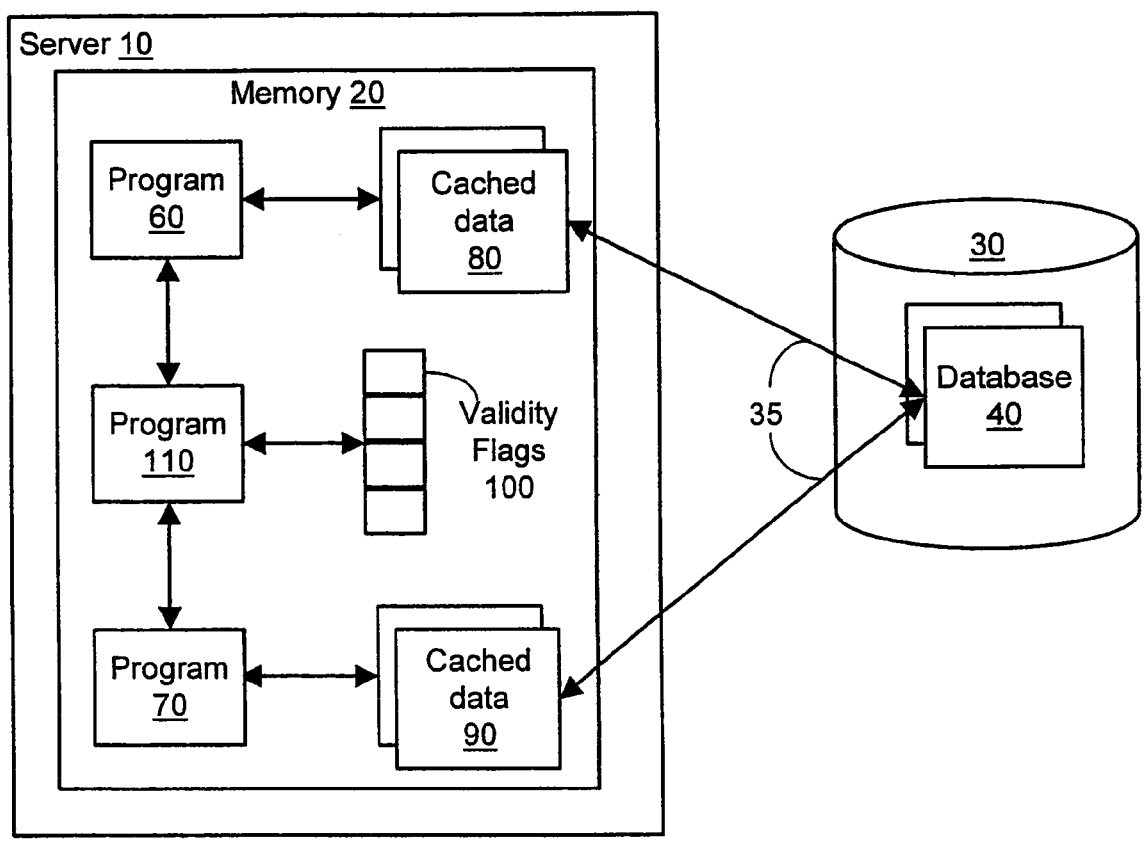
FIG. 3 illustrates a server with programs using local copies of a data set and a program to manage data synchronization according to one embodiment.

FIG. 3—A Server with Programs Using Local Copies of a Data Set and a Program to Manage Data Synchronization FIG. 3 illustrates one embodiment of a server 10 including a memory 20 connected to a data storage 30 by a data bus 35. Server 10 may include a single processor or several processors performing in parallel (processors not shown). A list of validity flags 100 may exist on server 10. In some embodiments, validity flags 100 may be provided on another medium, for example on a disk drive or in hardware registers. A primary copy of a database 40 may be stored on data storage 30. A data synchronization program 110 may be running on server 10. A program 60 running on server 10 may read a copy of a primary data set from database 40. The data set may be stored in memory 20 as cached data 80. Program 60 may then notify synchronization program 110 of the creation of cached data 80. Program 110 may then set a flag in validity flags 100 to indicate cached data 80 is valid. A program 70 running on server 10 may read a copy of the same primary data set from database 40 as that read by program 60. The data set may be stored in memory 20 as cached data 90. Program 70 may then notify synchronization program 110 of the creation of cached data 90. Synchronization program 110 may then set a validity flag in validity flags 100 to indicate cached data 90 is valid.

Program 60 may then modify cached data 80 and replace the primary copy of the data set in database 40 with cached data 80. Program 60 may then notify synchronization program 110 that cached data 80 has been modified. Synchronization program 110 may then search validity flags 100 for flags to other copies of the primary data set. Finding the validity flag for cached data 90, program 110 may then set the flag to invalid to indicate cached data 90 is out of synchronization with cached data 80 and the primary data set. In one embodiment, prior to accessing cached data 90, program 70 may check the flag in validity flags 100 for cached data 90. In another embodiment, program 70 may notify synchronization program 110 that program 70 needs to access cached data 90, and synchronization program 110 may then check the validity flag for cached data 90 in validity flag structure 100 and return the validity flag's status to program 70. If the validity flag is invalid, program 70 may then synchronize cached data 90 by reading the primary data set from database 40 into cached data 90. Program 70 may then notify synchronization program 110 that cached data 90 is synchronized. Synchronization program 110 may then set the validity flag for cached data 90 in validity flags 100 to valid, indicating that cached data 90 is synchronized.

Figure 4:
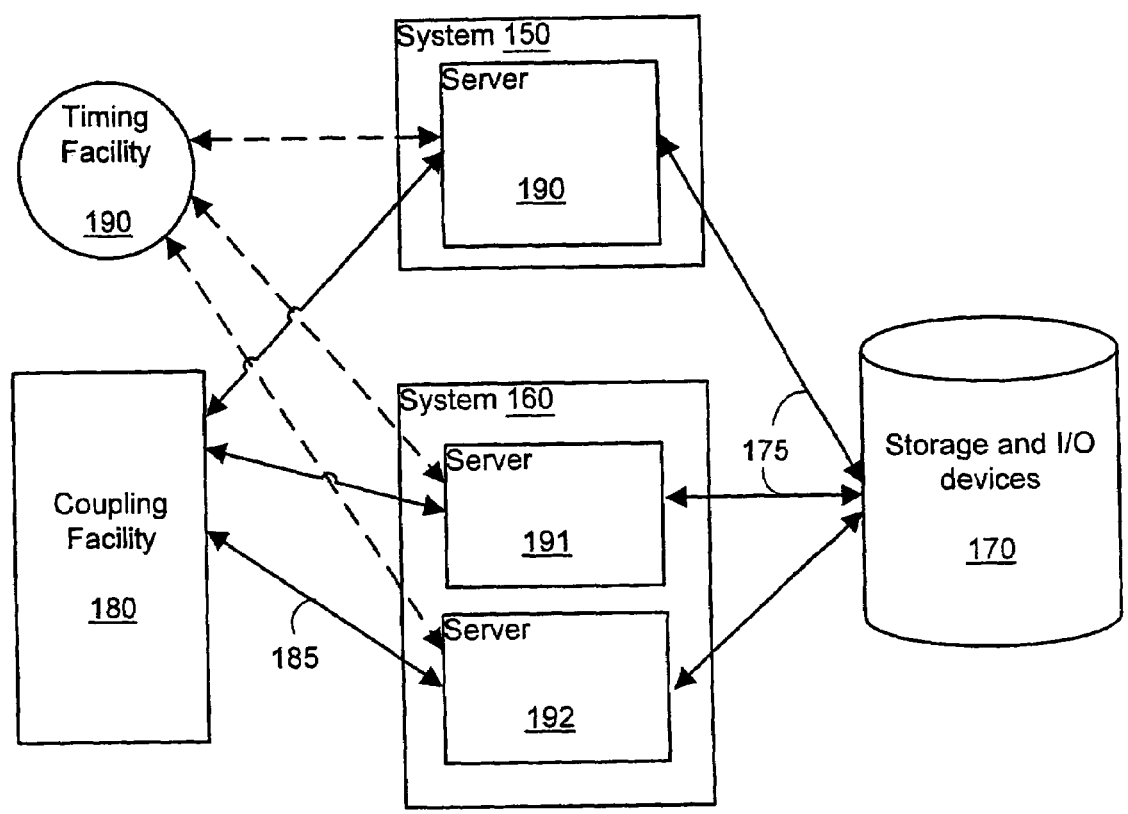
FIG. 4 is a high-level block diagram of a single-system image cluster.

FIG. 4—A High-Level Block Diagram of a Single-System Image Cluster System

FIG. 4 illustrates an embodiment of a single-system image cluster system that is suitable for implementing the synchronization system and method as described herein. The system may include multiple systems (two systems, systems 150 and 160, are shown) running mainframe operating systems such as OS/390 or MVS operating systems; at least one coupling facility 180 to assist in multisystem data sharing functions, wherein the coupling facility 180 is physically connected to systems in the cluster with high-speed coupling links 185; a timer facility 190 to synchronize time functions among the servers; and various storage and I/O devices 320, such as DASD (Direct Access Storage Devices), tape drives, terminals, and printers, connected to the systems by data buses or other physical communication links.

Also shown in system 160 is a system partitioned into more than one logical system or server (two servers, servers 191 and 192, are shown on system 160). The single-system image cluster system provides dynamic workload balancing among the servers in the cluster. To a client working at a terminal or to an application program running on the cluster, the servers and other hardware and software in a single-system image cluster system appear as one logical system.

Figure 5:
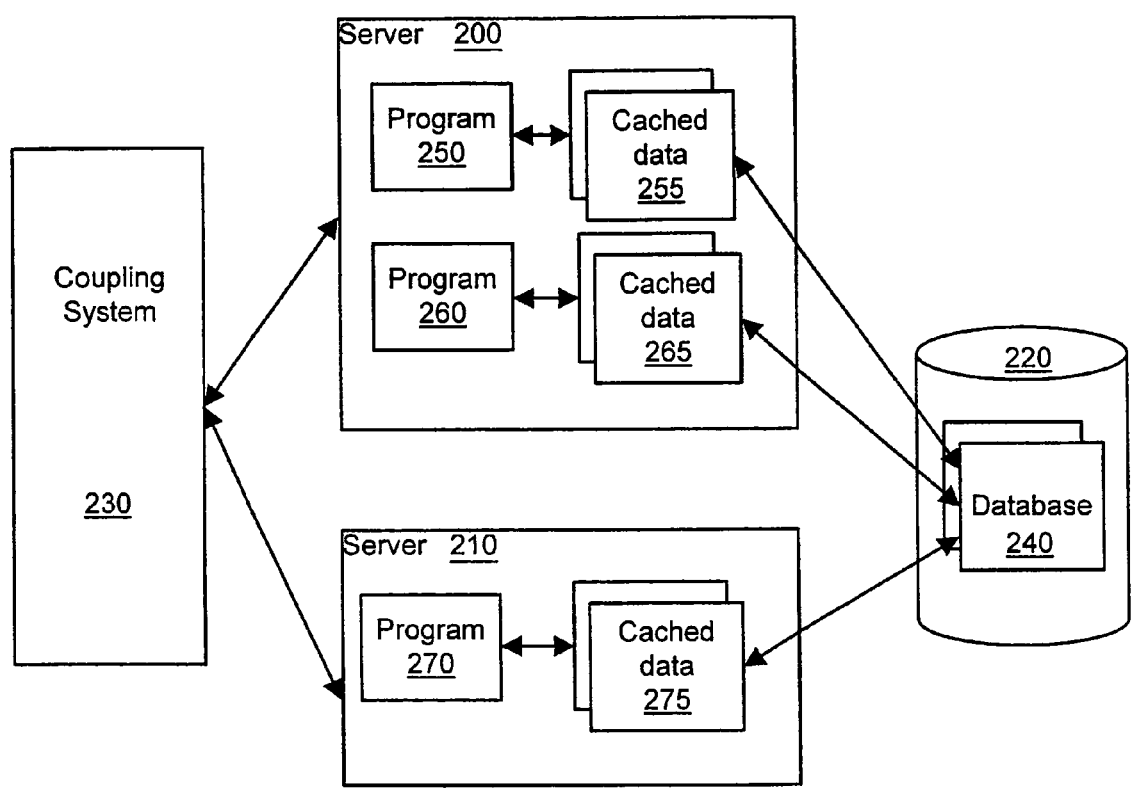
FIG. 5 illustrates a cluster system without program-level data synchronization.

FIG. 5—A Cluster System Without Program-Level Data Synchronization

In FIG. 5, an embodiment of a cluster system is shown without program-level data synchronization. Servers 200 and 210 may be connected to a storage device 220 and to a coupling system 230. A program 250, running on server 200, may read a copy of a primary data set from a database 240 and store the copy in a cached data 255. A program 260, running on server 200, may read a copy of the same primary data set from database 240 and store the copy in a cached data 265. A program 270, running on server 210, may also read a copy of the same primary data set from database 240 and store the copy in a cached data 275. Program 250 may then modify cached data 260 and write cached data 260 to database 240. Program 270 may then access cached data 275. Since coupling system 230 may not provide synchronization for the programs' cached data, cached data 275 may not be concurrent with the latest changes in database 240. It is possible that program 270 may write the non-concurrent cached data 275 to database 240 after program 250 has updated the database, overwriting the changes made by program 250.

Figure 6:
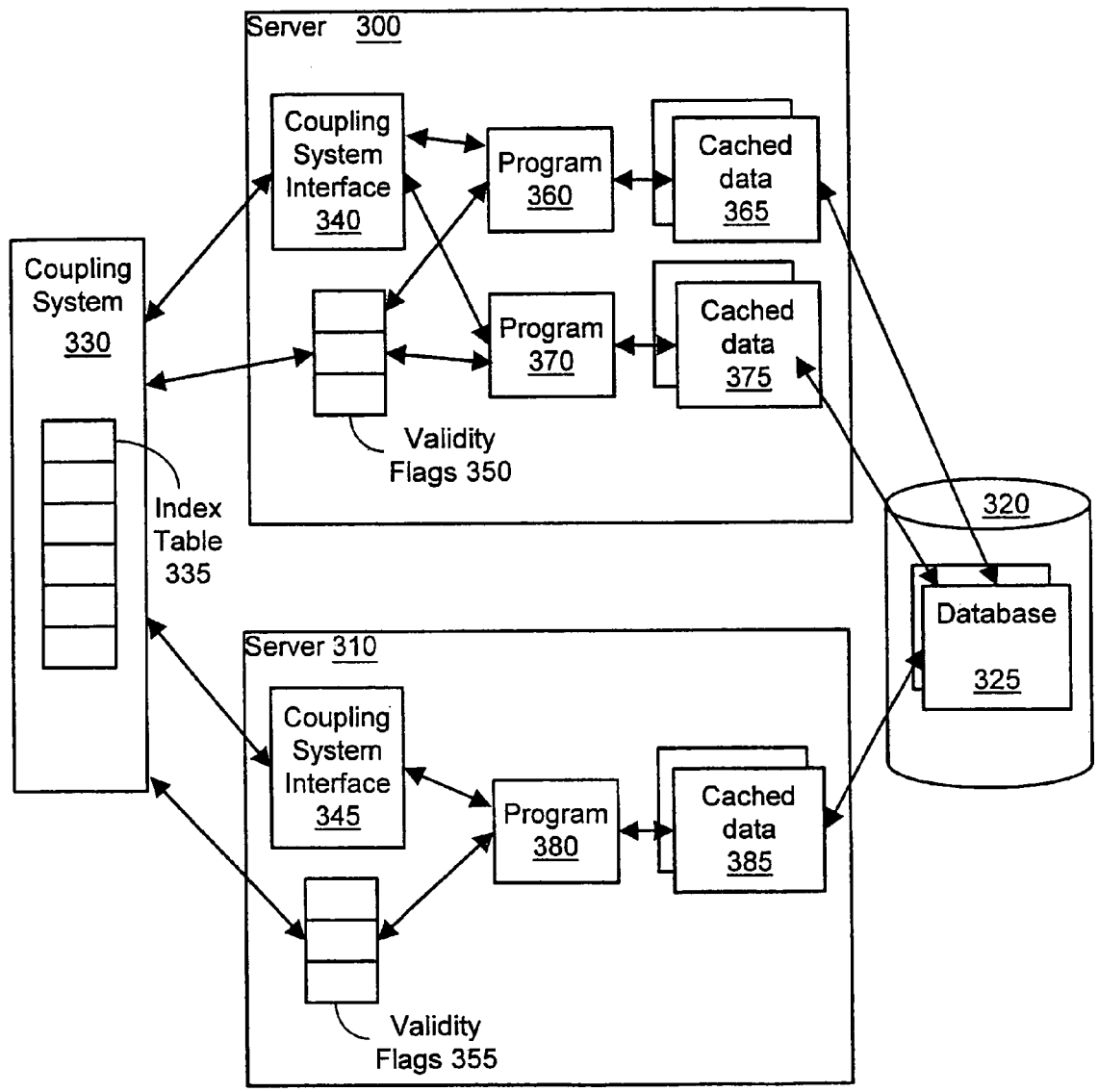
FIG. 6 illustrates a cluster system with program-level data synchronization according to one embodiment.

FIG. 6—A Cluster System with Program-Level Data Synchronization

FIG. 6 illustrates one embodiment of a cluster system with program-level data synchronization. A server 300 and a server 310 may be connected to a storage device 320 and to a coupling system 330. In one embodiment, the cluster is a single-system image cluster system, and the coupling system 330 is a Coupling Facility (CF). A database 325 may be stored on a storage device 320. A coupling system interface 340 may be running on server 300 and may establish a link with coupling system 330. The link may be maintained as long as coupling system interface 340 is running. A coupling system interface 345 may be running on server 310 and may establish a link with coupling system 330. The link may be maintained as long as coupling system interface 345 is running. Server 300 may include a list of validity flags 350, and server 310 may include a list of validity flags 355. In one embodiment, the cluster is a single-system image cluster system, and validity flags may be represented by bits in a Hardware Service Area (HSA) which may be located on systems in the cluster. A program 360, running on server 300, may read a copy of a primary data set from database 325 and store the copy in a cached data 365. Program 360 may then send a registration request to coupling system interface 340. The registration request may include a unique identifier or key which identifies cached data 365. Coupling system interface 340 may then forward the registration request to coupling system 330. Receiving the registration request, coupling system 330 may assign a validity flag in validity flags 350 to cached data 365, and may initialize the validity flag to valid. Coupling system 330 may then create an entry for cached data 365 in an index table 335. The entry may include information identifying the program 360 requesting data registration, information identifying the cached data 365 including the key passed in the registration request, and information identifying the location of the validity flag in validity flags 350 assigned to cached data 365. Coupling system 330 may then send a message including the identity of the validity flag in validity flags 350 assigned to cached data 365 to coupling system interface 340. Coupling system interface 340 may then forward the message to program 360. Program 360 may store the identity of the validity flag assigned to cached data 365 in program memory.

A program 370, running on server 300, may read a copy of the same primary data set from database 325 and store the copy in a cached data 375. Program 370 may then send a registration request to coupling system interface 340. The registration request may include a unique identifier or key which identifies cached data 375. Coupling system interface 340 may then forward the registration request to coupling system 330. Coupling system 330 may then perform the same synchronization tasks for cached data 375 as listed above for cached data 365.

A program 380, running on server 310, may also read a copy of the primary data set from database 325 and store the copy in a cached data 385. Program 380 may then send a registration request to coupling system interface 340. The registration request may include a unique identifier or key for cached data 385. Coupling system interface 340 may then forward the registration request to coupling system 330. Receiving the registration request, coupling system 330 may assign a validity flag in validity flags 355 to cached data 385, and may initialize the flag to valid. Coupling system 330 may then create an entry for cached data 385 in an index table 335. The entry may include information identifying the program 380 requesting data registration, information identifying the cached data 385 including the key passed in the registration request, and information identifying the location of the validity flag in validity flags 355 assigned to cached data 385. Coupling system 330 may then send a message including the identity of the validity flag in validity flags 355 assigned to cached data 385 to coupling system interface 345. Coupling system interface 345 may then forward the message to program 380, which may store the identity of the validity flag assigned to cached data 385 in program memory.

Program 360 may then modify cached data 365 and update the primary data set in database 325 with cached data 365. Program 360 may then send a cross invalidate message to coupling system interface 340. Coupling system interface 340 may then forward the cross invalidate message to coupling system 330. In one embodiment, a cross invalidate message may inform a coupling system that a primary data set has been modified, requiring the validity flags for all cached copies of the primary data set to be set to invalid. In one embodiment, a cross invalidate message may contain a key identifying the cached data that was modified and used to update the primary data set. Receiving the cross invalidate message, coupling system 330 may then search index table 335 for entries associated with copies of the same data set as in cached data 365. In one embodiment, a key passed in a cross invalidate message may be compared with keys previously passed in registration messages and stored in entries in an index table, with matching keys identifying copies of the same data set. Finding entries in the index table 335 for cached data 375 and cached data 385, coupling system 330 may use the validity flag location information stored in the index table entries to set the validity flags assigned to cached data 375 and cached data 385 to invalid, signifying that cached data 375 and cached data 385 are not concurrent with the primary data set. In one embodiment, a coupling system sets the flags to invalid one at a time or serially. In another embodiment, a coupling system sets the flags to invalid simultaneously.

Program 380 may then require access to cached data 385. In one embodiment, a program may directly check the validity flag assigned to a cached data in a list of validity flags. In another embodiment, a program may request the status of a validity flag from a coupling system interface, which may then check the validity flag assigned to a cached data in a validity flags list and return to the program the status of the validity flag assigned to the cached data. If the status of the flag is valid, program 380 may access cached data 385 directly. If the status of the flag is invalid, program 380 may replace cached data 385 with the latest version of the data set from database 325 before accessing cached data 385. In one embodiment, a program may then sets a validity flag in a list of validity flags associated with a cached data to valid. In another embodiment, a program notifies a coupling system interface that a cached data has been updated, and the coupling system interface sets the validity flag in the validity flags associated with the cached data to "valid."

Figure 7:
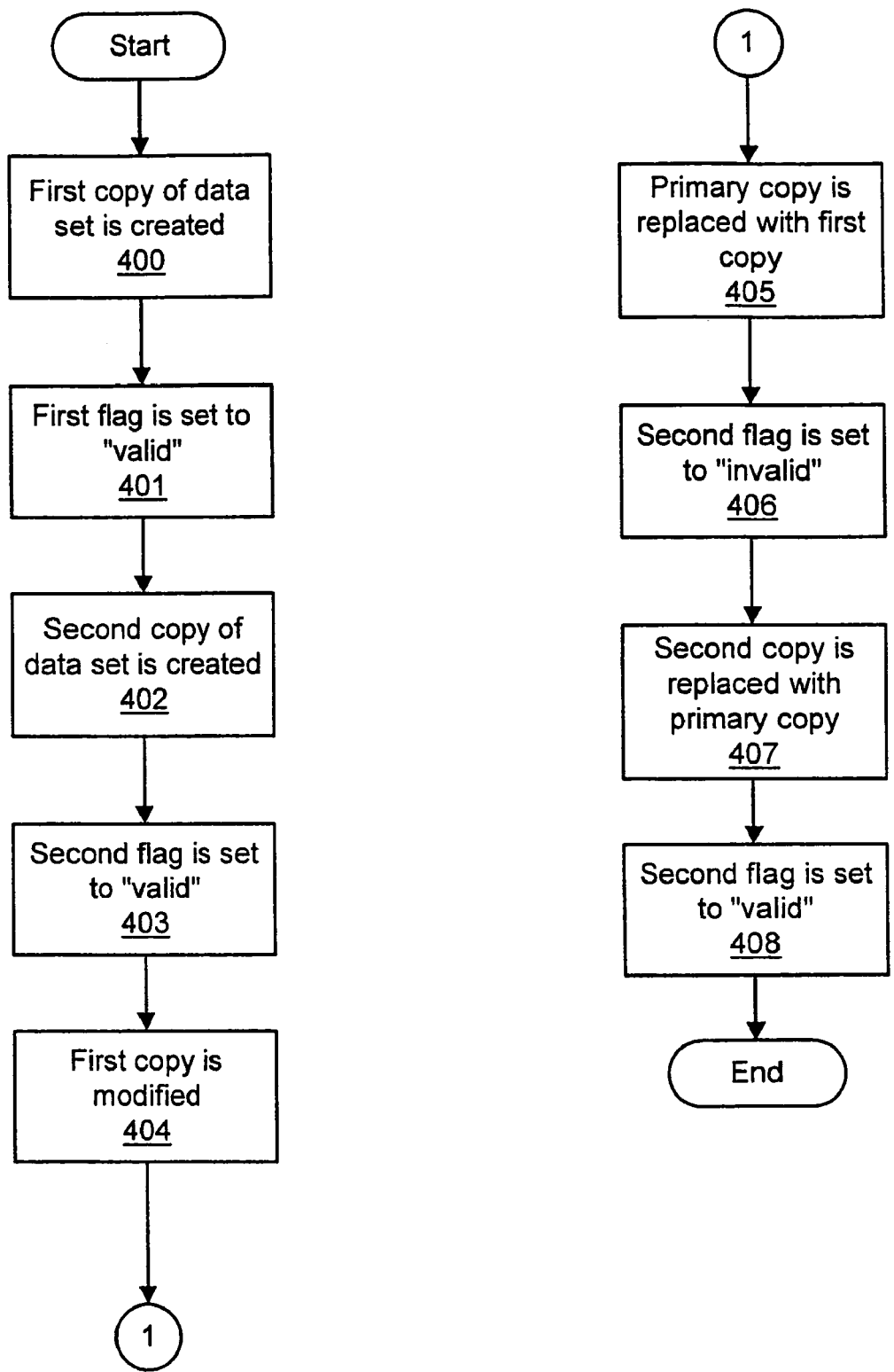
FIG. 7 is a flowchart illustrating the use of validity flags in data synchronization according to one embodiment.

FIG. 7—A Flowchart Illustrating the Use of Validity Flags in Data Synchronization In FIG. 7, a flowchart is presented to illustrate one embodiment of a method of data synchronization. In step 400, a first copy of a primary data set is created. A first validity flag is assigned to the first copy and initialized to "valid" in step 401. In step 402, a second copy of the primary data set is created. A second validity flag is assigned to the second copy and initialized to valid in step 403. In step 404, the first copy of the data set is modified, and the primary copy is replaced with the modified first copy in step 405. In response to the primary copy being updated, the second flag is set to invalid in step 406. In step 407, the second copy is replaced with the primary copy as a result of the validity flag associated with the second copy being invalid. In step 408, the second flag is set to valid to indicate the second copy has been updated.

Figure 8:
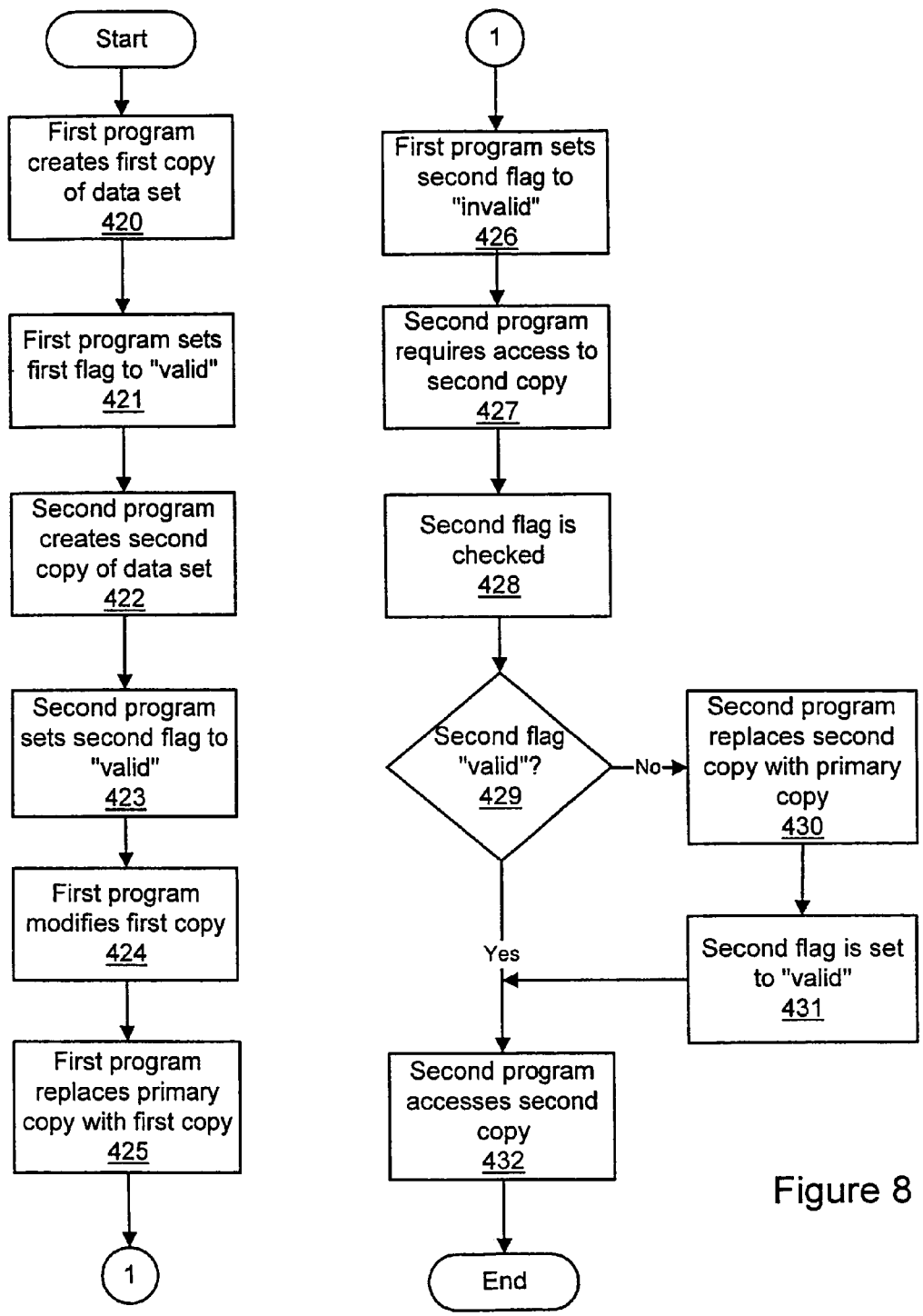
FIG. 8 is a flowchart illustrating two programs using validity flag to synchronize data according to one embodiment.

FIG. 8—A Flowchart Illustrating Two Programs Using Validity Flags to Synchronize Data In FIG. 8, a flowchart is presented to illustrate one embodiment of a method where two programs cooperate in data synchronization. In step 420, a first program creates a first copy of a primary data set. The first program sets a first validity flag to valid for the first copy in step 421. In step 422, a second program creates a second copy of a primary data set. The second program sets a second validity flag to valid for the second copy in step 423. In step 424, the first copy of the data set is modified by the first program, and the primary copy is replaced with the modified first copy by the first program in step 425. The validity flag associated with the second copy is set to invalid by the first program in step 426. In step 427, the second program requires a read or write access to the second copy. Before accessing the second copy, the second program checks the status of the second validity flag in step 428. If the second flag is valid, the second program proceeds to step 432 and accesses the second copy. If the second flag is invalid, the second program proceeds to step 430 and replaces the second copy with the primary copy. In step 431, the second flag is set to valid by the second program to indicate the second copy has been updated, and the second program proceeds to step 432 and accesses the second copy.

Figure 9:
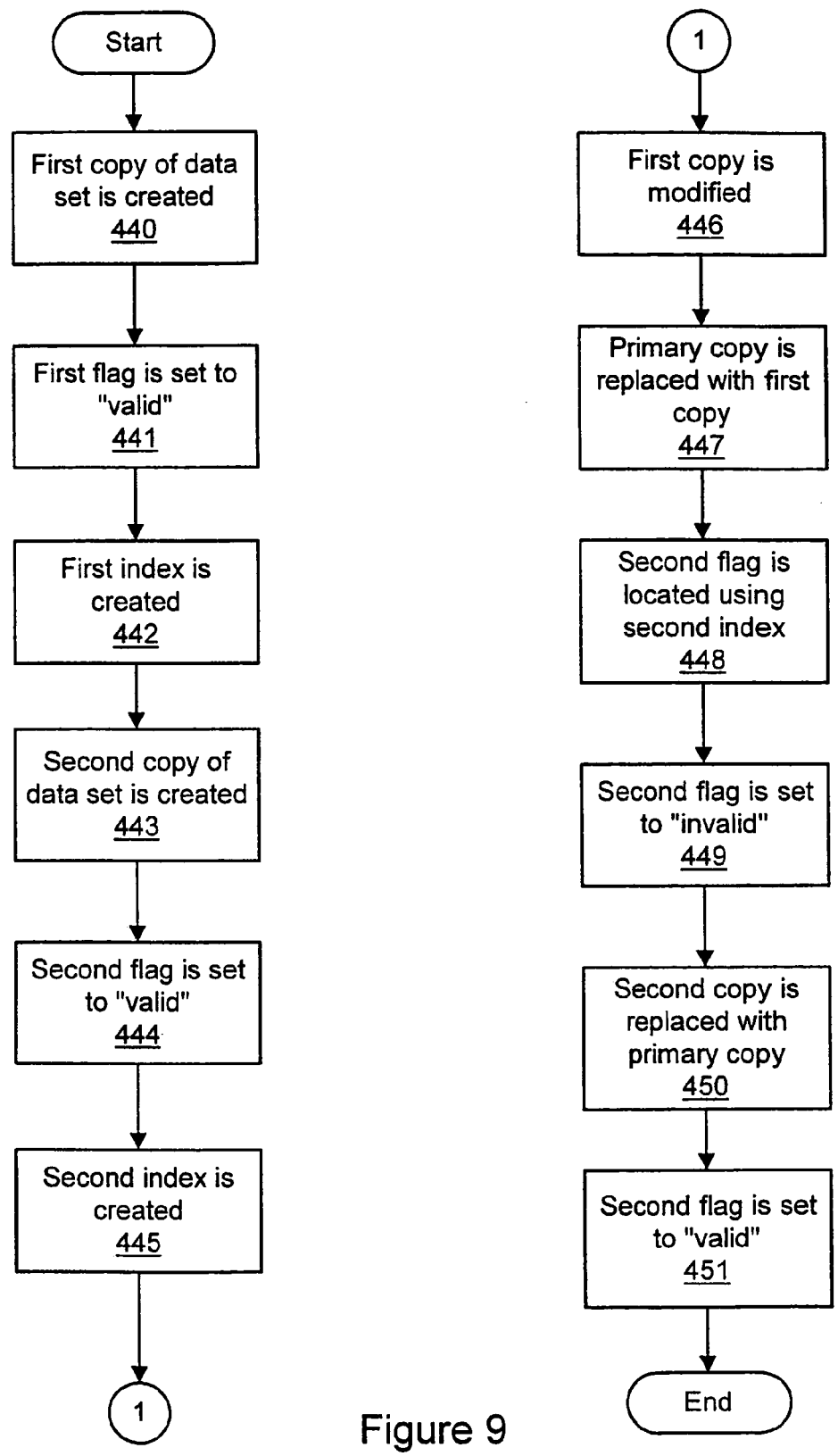
FIG. 9 is a flowchart illustrating creating indexes to copies of data sets during the synchronization process according to one embodiment.

FIG. 9—A Flowchart Illustrating Creating Indexes to Copies of Data Sets During the Synchronization Process In FIG. 9, a flowchart is presented to illustrate one embodiment of a method of data synchronization where an index is created for the data set copies. In step 440, a first copy of a primary data set is created. A first validity flag is assigned to the first copy and initialized to valid in step 441. In step 442, a first index to the first copy is created and stored in an index table. The first index may include a unique identifier, or key, that identifies the first copy. The first index may also include information that may be used to locate the first flag. In step 443, a second copy of the primary data set is created. A second validity flag is assigned to the second copy and initialized to valid in step 444. In step 445, a second index to the second copy is created and stored in the index table. The second index may include a unique identifier, or key, that identifies the second copy. The second index may also include information that may be used to locate the second flag. In step 446, the first copy of the data set is modified, and the primary copy is replaced with the modified first copy in step 447. In step 448, the index table may be searched using the first index key, the first index key may be matched to the second index key in the index table, and the second flag located with the flag location information in the second index. The second flag is set to invalid in step 449. In step 450, the second copy is replaced with the primary copy as a result of the validity flag associated with the second copy being invalid. In step 451, the second flag is set to valid to indicate the second copy has been updated.

Figure 10A:
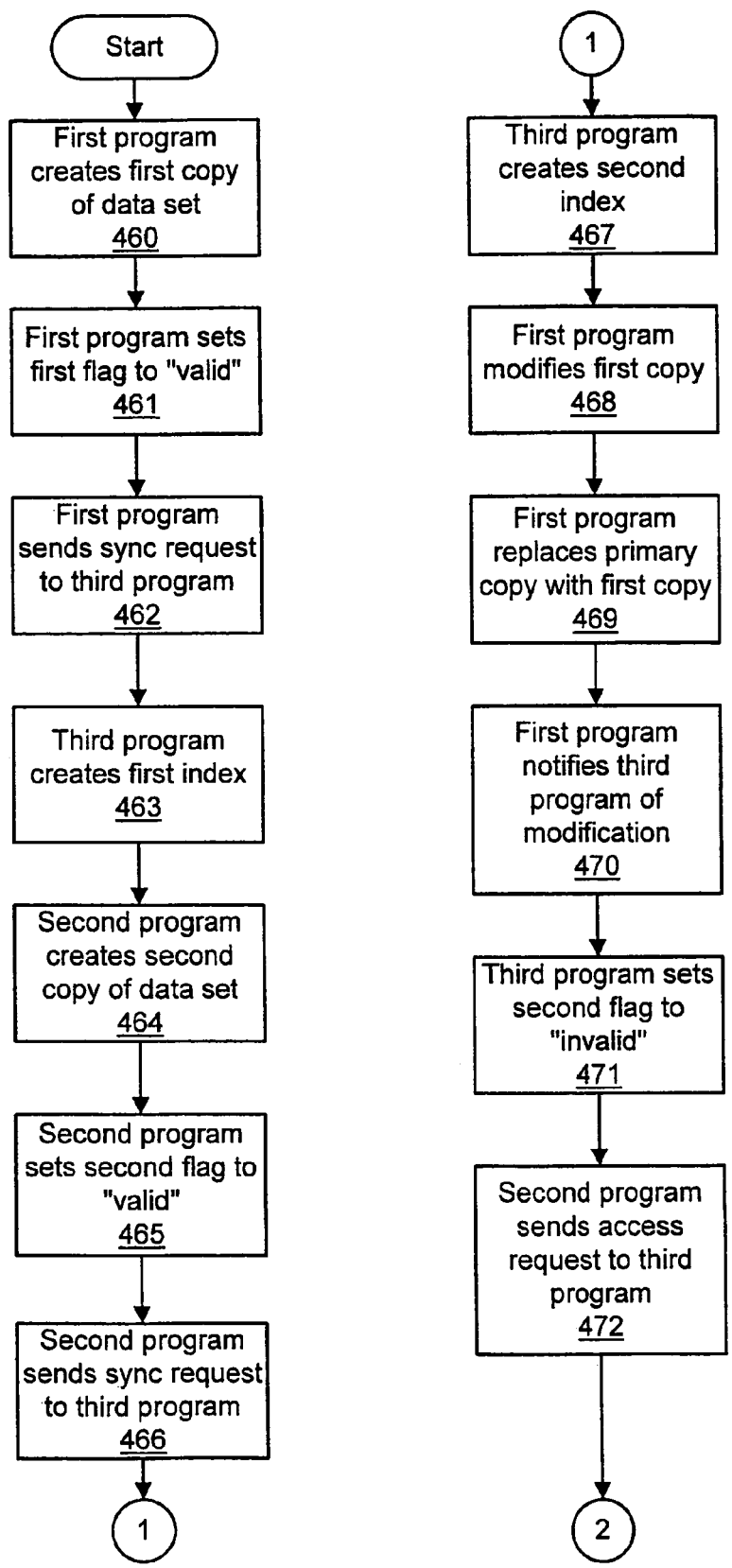
FIG. 10a is a flowchart illustrating a synchronization program managing the data synchronization process for other programs according to one embodiment.
Figure 10B:
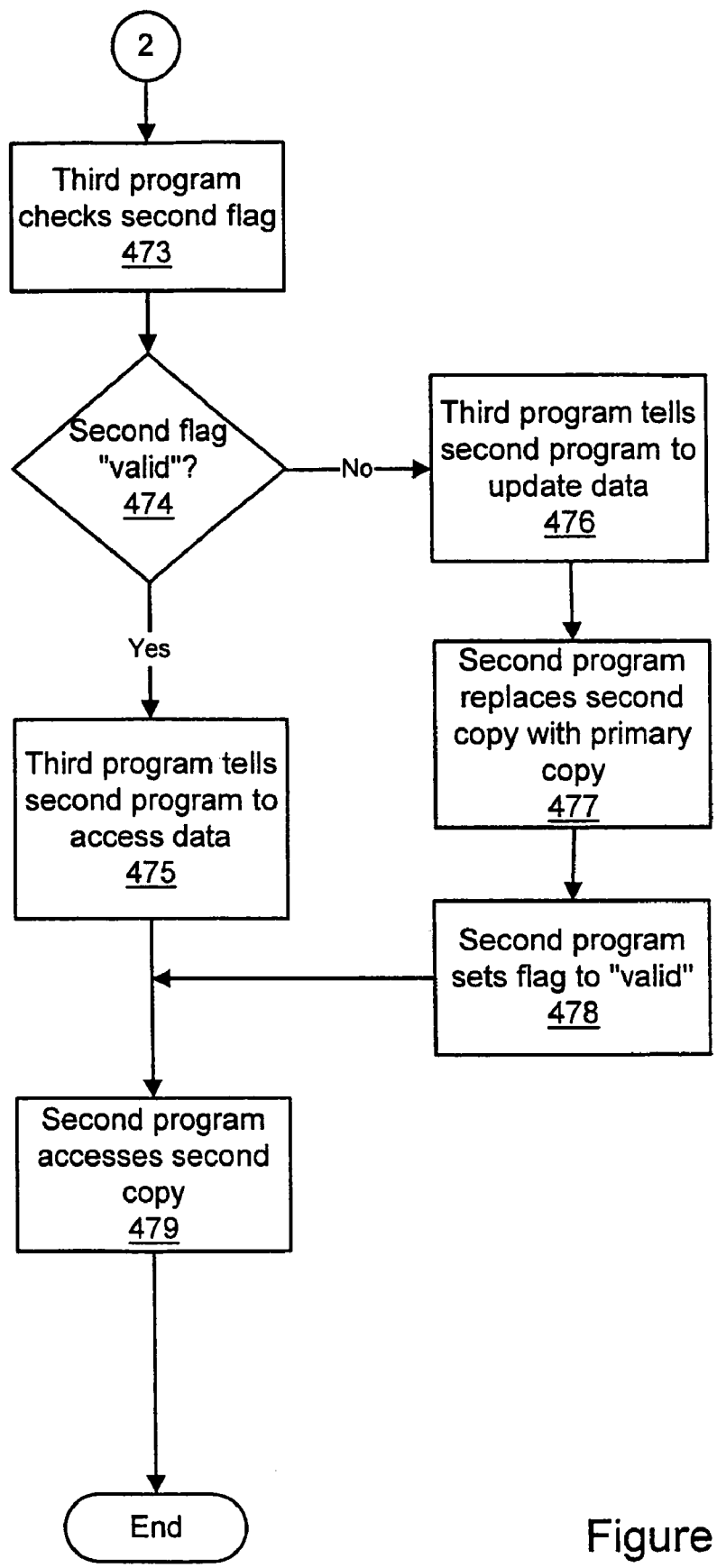

FIGS. 10a and 10b—A Flowchart Illustrating a Synchronization Program Managing the Data Synchronization Process for Other Programs FIGS. 10a and 10b present a flowchart illustrating one embodiment of a method of data synchronization where a synchronization program manages the synchronization process for other programs. In step 460, a first program creates a first copy of a primary data set. A first validity flag is assigned to the first copy, and the first program initializes the first flag to valid in step 461. In step 462, the first program sends a synchronization request to the third program (the synchronization program). In step 463, a first index to the first copy is created by the third program and stored in an index table. The first index may include a unique identifier, or key, that identifies the first copy. The first index may also include information that may be used to locate the first flag. In step 464, a second program creates a second copy of the primary data set. A second validity flag is assigned to the second copy, and the second program initializes the second flag to valid in step 465. In step 466, the second program sends a synchronization request to the third program. In step 467, a second index to the second copy is created by the third program and stored in an index table. The second index may include a unique identifier, or key, that identifies the second copy. The second index may also include information that may be used to locate the second flag. In step 468, the first copy of the data set is modified by the first program, and the primary copy is replaced with the modified first copy by the first program in step 469. In step 470, the first program notifies the third program that the primary copy has been modified. In step 471, the third program sets the second flag to invalid. The second program requires access to the second copy and sends an access request to the third program in step 472. The third program checks the second validity flag in step 473. In step 474, if the second validity flag is valid, the third program proceeds to step 475 and tells the second program to access the second copy. In step 474, if the second validity flag is invalid, the third program proceeds to step 476 and tells the second program the second copy must be updated before accessing it. In step 476, the second program replaces the second copy with the primary copy. In step 477, the second program sets the second flag to valid to indicate the second copy has been updated. The second program then accesses the second copy in step 478.

Figure 11:
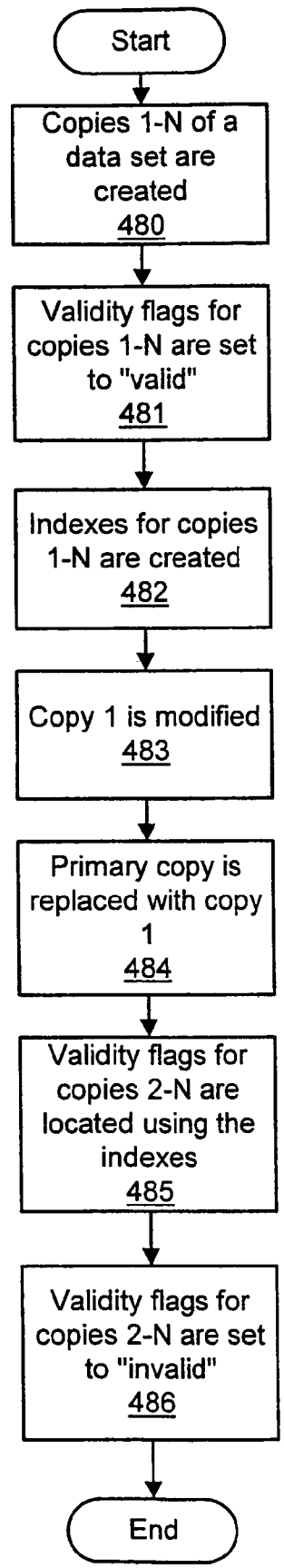
FIG. 11 is a flowchart illustrating the synchronization process for multiple copies of a data set according to one embodiment.

FIG. 11—A Flowchart Illustrating the Synchronization Process for Multiple Copies of a Data Set FIG. 11 illustrates one embodiment of a method of data synchronization applied to multiple copies of a data set. It is important to note that all of the examples of embodiments described herein may be extended to cover multiple copies as described in this embodiment. N is used to represent a number of copies that may be created. Examples of factors that may limit the number of copies that may be created include, but are not limited to, an operating system-imposed limit, an application-imposed limit, a limit on the number of resources such as validity flags and index table entries, or a limit on memory available. In step 480, copies 1-N of a data set are created. Validity flags are initialized to "valid" for copies 1-N in step 481, and indexes for copies 1-N are created and stored in an index table in step 482. In step 483, a copy 1 is modified, and the primary copy is replaced with copy 1 in step 484. In step 485, the index table is searched for all indexes that match the index of copy 1, and indexes 2-N are located. In step 486, validity flag location information stored in indexes 2-N is used to set validity flags 2-N to invalid.

Figure 12A:
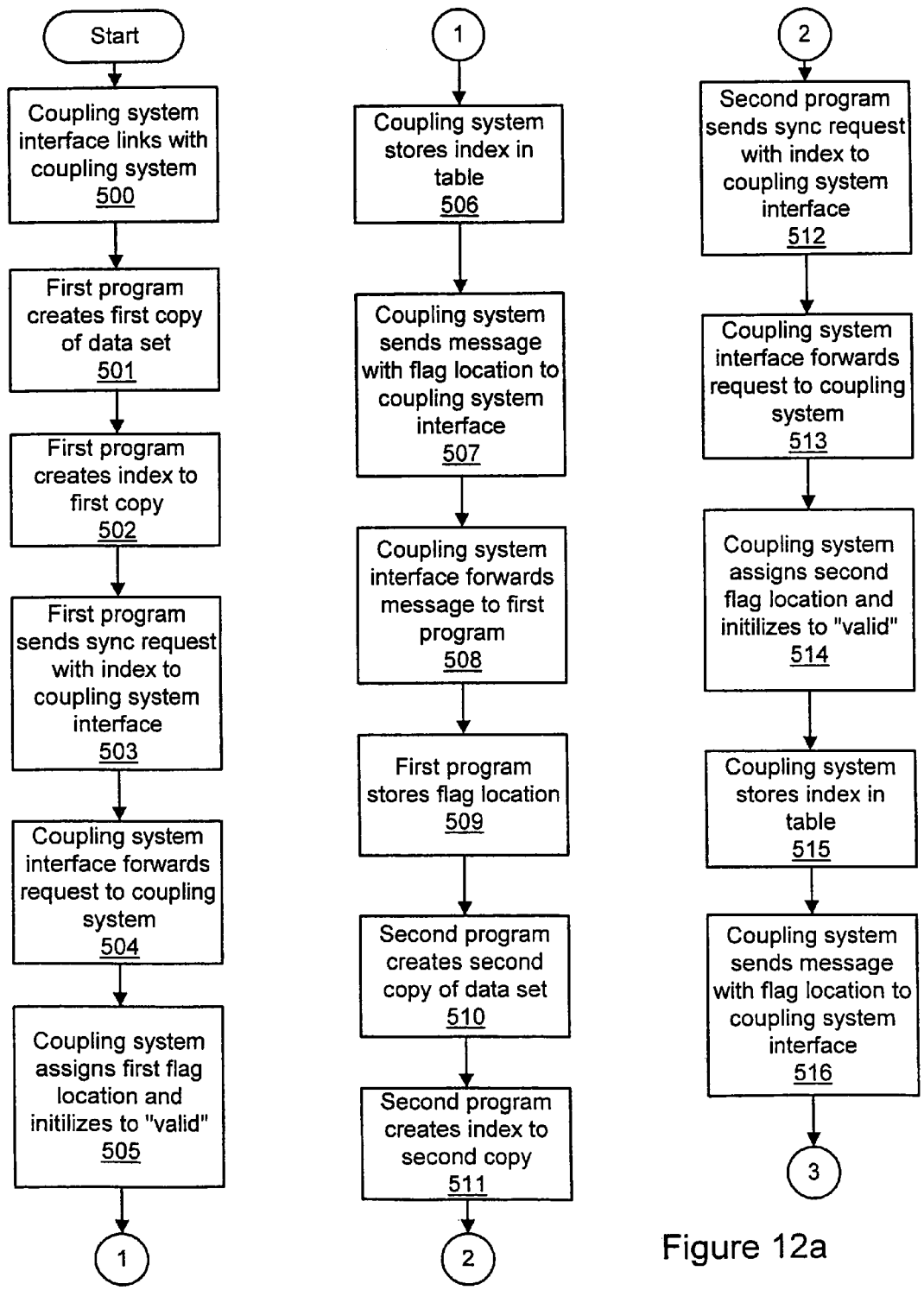
FIG. 12a is a flowchart illustrating a coupling system interface providing an interface between a coupling system and multiple programs to provide data synchronization according to one embodiment.
Figure 12B:
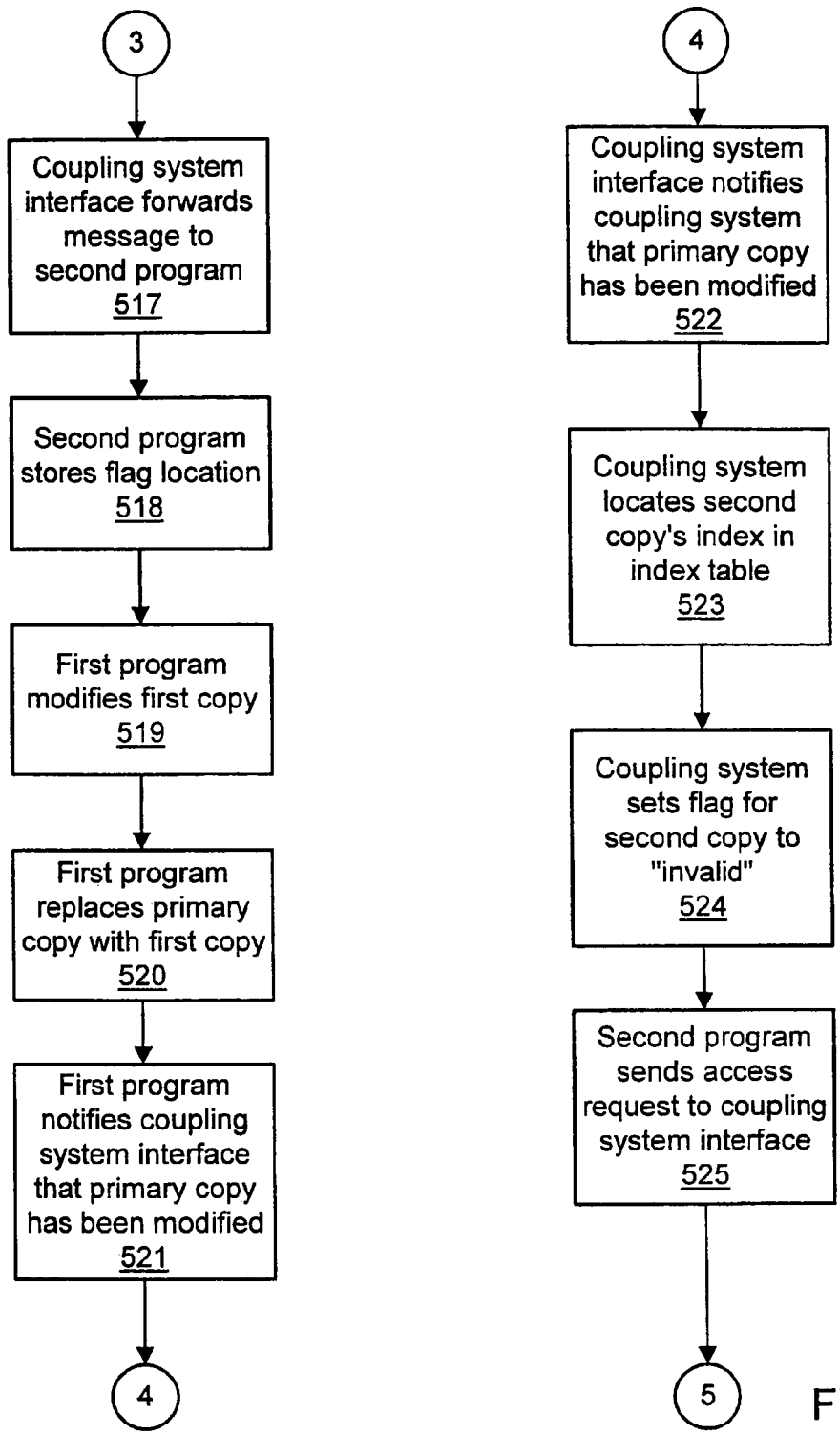
Figure 12C:
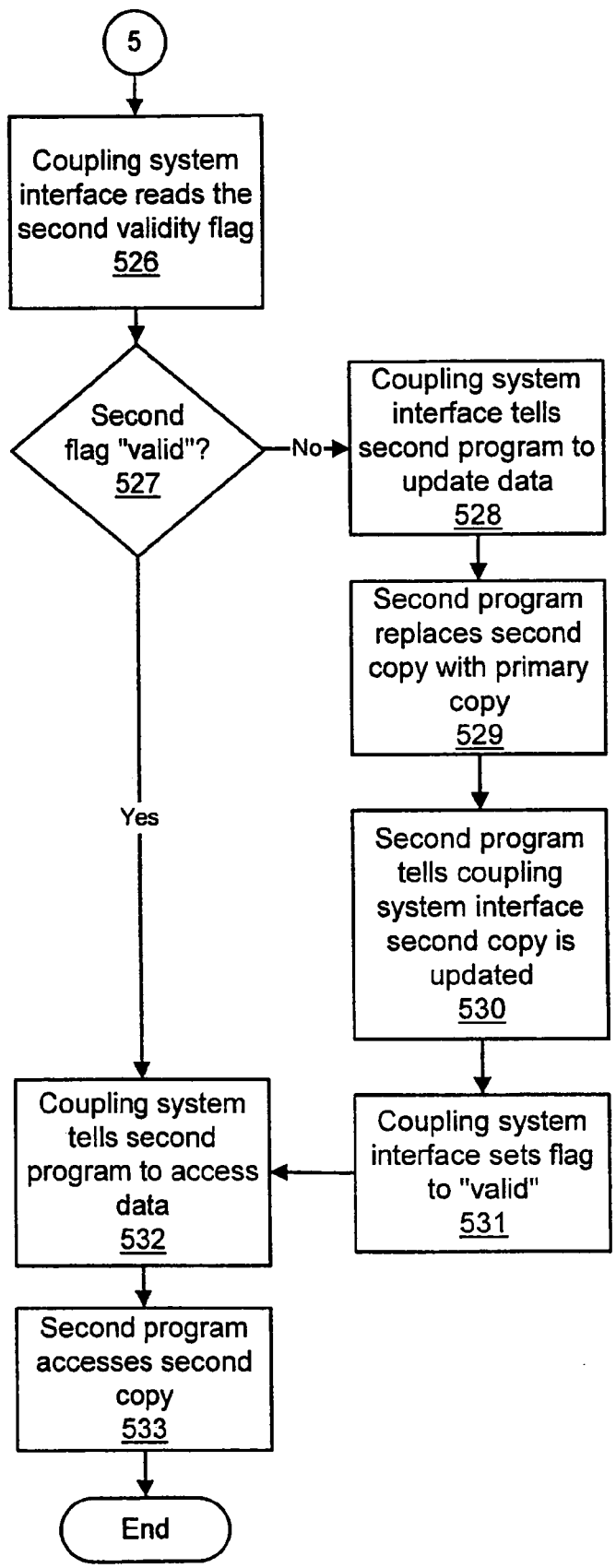
FIG. 12c is a continuation of flowchart 12b.

FIG. 12a, 12b, and 12c—A Flowchart Illustrating a Coupling System Interface Between a Coupling System and Multiple Programs to Provide Data Synchronization In FIGS. 12a–12c, a flowchart is used to illustrate one embodiment of a cluster system including a coupling system and a coupling system interface between the coupling system and multiple programs running on the cluster's servers. In one embodiment, the cluster system may be a single-system image cluster system with at least one Cluster Facility (CF). In step 500, a coupling system interface, a program running on a first server in the cluster, establishes a link with the coupling system. In one embodiment, the link may be maintained by the coupling system interface as long as the coupling system interface is running and the coupling system is available.

In step 501, a first program running on the first server creates a first copy of a primary data set. In one embodiment, a data set may be extracted from a database stored on a data storage device shared by the servers in the cluster. In one embodiment, a data set may be constructed from multiple sources on a data storage, wherein the data in the data set may not have a one-to-one correspondence to a physical data set in a database. Examples of data sets include, but are not limited to, a data record, a data group, a data table, a random table, and a row from a table. A data record may be defined as a grouping of one or more data items. The data items typically provide information about an object or entity. Data items in a record may be referred to as fields in the record. A data group may be defined as a collection of logically related data fields that may be stored in contiguous memory. A data table may be defined as a type of data set in which data records are stored in rows, a row including one or more records, and where the table includes one or more types of row. A random table may be defined as multiple occurrences of a data group accessed by a specific key via a hashing algorithm. A row may be defined as a row extracted from a data table or random table.

In step 502, the first program creates an index to the first copy. In one embodiment, an index may be created from a field or fields of a data set. The field or fields used to create an index may include a unique identifier or key that may serve to distinguish the data set from other data sets in the database. Examples of types of data sets that may include a key used to uniquely identify the data set include, but are not limited to, a record, a group, a data table, a random table, and a row. In one embodiment, a key is created for data sets when the data sets are initially created in the database. In another embodiment, a utility program may be used to modify an existing database by creating a key for data sets in the database. In one embodiment, the index may also include a field containing information that may be used to distinguish between copies of a data set. Thus, the index may be useful for distinguishing among different data sets, for identifying copies of a particular data set, and for distinguishing among copies of a data set during the data synchronization process.

In step 503, the first program sends a synchronization request, which may be referred to as a registration request, to the coupling system interface. The request may include the index created by the first program. In one embodiment, a request may also include information identifying a program as the sender of the request. In one embodiment, the request may be sent to the coupling system interface, and the coupling system interface may processed the request immediately. In one embodiment, if a coupling system interface is busy at the time a program attempts to send the request, the program may wait for the coupling system interface to complete its current operation before sending the request. In another embodiment, a coupling system interface may include a message queue, a program may post a request in the message queue, and the coupling system interface may process messages posted in the message queue in a priority order. An example of a priority order that may be used in some embodiments is first-in, first-out (FIFO) processing. A number of embodiments utilizing other priority ordering schemes will be obvious to one skilled in the art.

In step 504, the coupling system interface forwards the registration request to the coupling system. The coupling system then processes the registration request. In step 505, the coupling system assigns a first validity flag in a validity structure on the first server to the first copy and initializes the first flag to valid. In one embodiment, a validity structure may be a portion of memory where each bit in the portion represents one flag. In another embodiment, a validity structure may be a list of data structures, a data structure may include one or more fields, and one or more fields may represent the validity flag. In one embodiment, a validity flag may be represented by one bit, 1 (bit set) may indicate valid data, and 0 (bit clear) may indicate invalid data. In another embodiment, a flag may be represented by one bit, 1 (bit set) may indicate invalid data, and 0 (bit clear) may indicate valid data. In another embodiment, a validity flag may include more than one bit. In yet another embodiment, a validity flag may be a field in a data structure, and the field may be set to different values to represent valid and invalid data sets. In one embodiment the system may be a single-system image cluster system, and the flag may be a bit in the Hardware Service Area (HSA). In step 506, the coupling system stores the index in an index table on the coupling system. In one embodiment, a coupling system may append information that may be used to identify the location of a validity flag to an index. In one embodiment, information used to identify a validity flag location may include an identifier for a server the flag is located on, a memory address of a validity structure on the server, and an identifier for a field in the validity structure including the flag. In another embodiment, the system may be a single-system image cluster system, a validity flag may be a bit in the Hardware Service Area (HSA), and a vector may be used to identify the bit in the HSA.

In step 507, the coupling system sends a confirmation message to the coupling system interface. In one embodiment, a confirmation message may include information used to identify a validity flag assigned to a cached copy. In another embodiment, a confirmation message may include information to identify a program that created a cached copy. In yet another embodiment, a confirmation message may include information to identify a cached copy. In one embodiment, a coupling system interface may keep a copy of information in a confirmation message in local memory, which then may be used to directly access a validity flag associated with a cached copy. In step 508, the coupling system interface forwards the message to the first program. In step 509, the first program stores in its local memory information from the message that may be used to locate the first validity flag.

In steps 510–518, the second program follows the same process the first program followed in steps 501–509. In the following description, the second program is described as running on a second server in the cluster, but it is to be understood that the process may be applied to a second process running on the first server. In step 510, the second program creates a second copy of the primary data set on the second server. In step 511, the second program creates an index to the second copy. The second program sends a registration request including the index to a coupling system interface running on the second server in step 512. In step 513, the coupling system forwards the registration request to the coupling system. In step 514, the coupling system assigns and initializes a second validity flag in the validity flag structure located on the second server. In step 515, the coupling system stores the index and the second flag location in the index table. The coupling system then sends a confirmation message to the coupling system interface in step 516. The message is forwarded to the second program by the coupling system interface in step 517. In step 518, the second program stores the second flag location information in local memory.

The first program checks the first validity flag, finds the flag to be valid, and modifies the first copy in step 519. The first program updates the database with the modified first copy in step 520. In step 521, the first program sends a message to the coupling system interface indicating that the first copy has been modified. The message may be called a "cross invalidation" message. In one embodiment, the message may include the index identifying the first copy. The coupling system interface forwards the message to the coupling system in step 522.

The coupling system then processes the cross invalidation message. In step 523, the coupling system uses the information in the message to search the index table for other copies of the same data set as the first copy, and finds the index for the second copy. In one embodiment, the index passed in the message is used to match with other indexes in the index table. A key in the index may uniquely identify the data set that has been copied. In one embodiment, information in the index may be used to distinguish among copies of a data set, so that the search skips the index to the first copy when the index to the first copy in the index table exactly matches the index to the first copy in the message. After locating the index to the second copy, the coupling system sets the second validity flag for the second copy to invalid in step 524. In one embodiment, the coupling system may use information stored with the index in the index table to find the second validity flag.

At some point, the second program may desire to access the second copy of the data set. In one embodiment, the second program may send an access request message to the coupling system interface in step 525, and the coupling system interface may read the second validity flag in step 526. In one embodiment, the second program may send information used to locate the second flag in the access request message. In another embodiment, the coupling system interface may have stored the information identifying the location of the second flag when processing the confirmation message from the coupling system, and may use the stored information to read the second flag. After reading the second flag, the coupling system interface checks the results of the read in step 527. If the flag is valid, the coupling system interface proceeds directly to step 532 and sends a message to the second program telling it to proceed with the access of the second copy. If the flag is invalid, the coupling system interface proceeds to step 528 and sends a message to the second program telling it to update the second copy before proceeding. In step 529, the second program updates the second copy with the primary copy from the database, and then sends a message notifying the coupling system interface that the second copy has been updated in step 530. The coupling system interface sets the second flag to valid in step 531. In step 532, the coupling system interface sends a message to the second program telling the second program to proceed with the access of the second copy. In one embodiment, steps 530 and 531 may be replaced by the second program directly setting the second flag to valid after updating. Finally, in step 533 the second program accesses the second copy.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method comprising:
reading a first copy of a primary data set in a primary memory location;
storing the first copy in a first memory location;
setting a first validity flag to indicate that the first copy is valid;
reading a second copy of the primary data set in the primary memory location;
storing the second copy in a second memory location;
setting a second validity flag to indicate that the second copy is valid;
modifying the first copy;
setting the second validity flag to indicate that the second copy is invalid after modifying the first copy;
replacing the primary data set with the modified first copy after the modifying of the first copy and before the setting of the second validity flag to indicate that the second copy is invalid;
replacing the second copy with the primary data set after the setting of the second validity flag to indicate that the second copy is invalid;
setting the second validity flag to indicate that the second copy is valid after replacing the second copy with the primary data set;
creating a first index corresponding to the first copy, wherein the first index is stored in a fourth memory location, wherein the first index is created after reading the first copy from the primary data set, and wherein the first index comprises a first field comprising a description of a copy of the data for which the first index was created; and a second field comprising a memory location for a validity flag for the copy of the data set for which the first index was created; and
creating a second index corresponding to the second copy, wherein the second index is stored in the fourth memory location, wherein the second index is created after reading the second copy from the primary data set, and wherein the second index comprises a first field comprising a description of a copy of the data for which the second index was created; and a second field comprising a memory location for a validity flag for the copy of the data set for which the second index was created.

2. The method of claim 1, wherein a first program is associated with the first copy, and a second program is associated with the second copy.

3. The method of claim 1, wherein replacing the second copy with the primary data set further comprises:
reading the second validity flag in response to a program requesting access to the second copy; and
replacing the second copy with the primary data set before granting the access request if the second validity flag indicates that the second copy is invalid.

4. The method of claim 1, further comprising:
locating the second validity flag by using the second index before setting the second validity flag to indicate that the second copy is invalid.

5. The method of claim 1, further comprising:
matching the first index and the second index by comparing the first field of the first index and the first field of the second index; and
wherein locating the second validity flag further comprises locating the second validity flag by referencing contents of the second field of the second index.

6. The method of claim 5, further comprising:
reading and storing a plurality of copies of the primary data set at respective memory locations;
setting a validity flag to indicate the copy is valid in response to reading and storing the copy; and
creating an index to the copy in the fourth memory location in response to reading and storing the copy.

7. The method of claim 6, further comprising:
setting the validity flag of every copy other than the first copy to invalid after modifying the first copy.

8. The method of claim 1, wherein a first program is associated with the first copy and a second program is associated with the second copy, the method further comprising:
the first program requesting that a third program synchronize the first copy with other copies of the primary data set;
the third program creating the first index corresponding to the first copy in the fourth memory location in response to the first program requesting that the third program synchronize the first copy with other copies of the primary data set;
the second program requesting that the third program synchronize the second copy with other copies of the primary data set; and
the third program creating the second index corresponding to the second copy in the fourth memory location in response to the second program requesting that the third program synchronize the second copy with other copies of the primary data set.

9. The method of claim 8, further comprising:
the first program modifying the first copy;
the first program replacing the primary data set with the first copy;
the first program notifying a third program that the primary data set has been modified; and
the third program setting the second validity flag to indicate that the second copy is invalid in response to the first program notifying the third program that the primary data set has been modified, wherein the third program is configured to manage the synchronization of copies of data sets.

10. The method of claim 9, further comprising:
the second program notifying the third program that the second program desires to access the second copy;
the third program reading the second validity flag;
the third program notifying the second program that the second copy is invalid when the second validity flag is invalid;
the second program reading the primary data set and replacing the second copy with the primary data set;
the third program setting the second validity flag to indicate that the second copy is valid; and
the second program accessing the second copy when the second validity flag is valid.

11. The method of claim 9, further comprising:
the second program reading the second validity flag;
the second program reading the primary data set and replacing the second copy with the primary data set when the second validity flag is invalid; and
the second program setting the second validity flag to valid.

12. The method of claim 8, wherein the first program and the second program are executable on a computer system, wherein the computer system is a cluster, and wherein the cluster comprises:

a plurality of computers, wherein a computer comprises a local memory and at least one validity flag, and wherein a copy of a data set that is stored in the local memory is assigned at least one corresponding validity flag;
a coupling system comprising a local memory, wherein the coupling system is connected to each of the computers in the cluster, and wherein the coupling system is configured to coordinate data sharing of the cluster; and
an external data storage shared by the computers in the cluster.

13. The method of claim 12, wherein each computer further comprises a coupling system interface program configured to communicate between the coupling system and a plurality of programs running on the computer, wherein the coupling system interface program establishes and maintains a communications link to the coupling system.

14. The method of claim 13, wherein the local memory of a first computer in the cluster comprises the first memory location, the local memory of a second computer in the cluster comprises the second memory location, the external data storage comprises the primary memory location, and the local memory of the coupling system comprises the fourth memory location.

15. The method of claim 14, further comprising creating a copy of the primary data set in the local memory of a plurality of computers in the cluster, wherein the creation of the copy comprises:
creating an index corresponding to the copy of the primary data set in the local memory of the coupling system;
assigning a validity flag to the copy of the primary data set; and
setting the validity flag to indicate that the copy of the primary data set is valid.

16. The method of claim 15, further comprising:
setting the validity flag of every copy other than the first copy is set to invalid after modifying the first copy.

17. The method of claim 14, wherein the first computer further comprises a first program associated with the first copy, and the second computer further comprises a second program associated with the second copy, the method further comprising:
the first program reading the first copy of the primary data set from the primary data set in the primary memory location;
the first program storing the first copy in the first memory location;
the first program creating the first index to the first copy;
the first program sending a request to synchronize the first copy with other copies of the primary data set to the coupling system interface, the request comprising sending the first index to a third program;
the coupling system interface program forwarding the request to synchronize the first copy to the coupling system;
the coupling system storing the first index to the first copy in the fourth memory location in response to the request;
the coupling system sending a first token to the coupling system interface, the first token comprising a location for the validity flag to be used for the first copy;
the coupling system interface program sending the first token to the first program;

the first program storing the first token in the first memory;

the second program reading the second copy of the primary data set from the primary data set in the primary memory location;

the second program storing the second copy in the second memory location;

the second program creating the second index to the second copy;

the second program sending a request to synchronize the second copy with other copies of the primary data set to the coupling system interface, the request comprising sending the second index to the third program;

the coupling system interface program forwarding the request to synchronize the second copy to the coupling system;

the coupling system storing the second index to the second copy in the fourth memory location in response to the request;

the coupling system sending a second token to the coupling system interface, the second token comprising a location for the validity flag to be used for the second copy;

the coupling system interface program sending the second token to the second program; and the second program storing the second token in the second memory.

18. The method of claim 13, wherein the coupling system interface program comprises a plurality of functions and an application programming interface, wherein each function is configured to perform at least one data synchronization task, and wherein the application programming interface is comprised of a plurality of function calls configured to provide external access to the functions, and wherein the function calls are accessible to a plurality of application programs.

19. A system comprising:
a plurality of computers comprising a cluster, wherein a computer comprises a local memory and at least one validity flag, and wherein a copy of a data set that is stored in the local memory is assigned at least one corresponding validity flag;
a coupling system comprising a local memory, wherein the coupling system is connected to each of the computers in the cluster, and wherein the coupling system is configured to coordinate data sharing of the cluster; and
an external data storage shared by the computers in the cluster;
wherein the local memories of the computers or the coupling system store program instructions, wherein the program instructions are executable by the computers or the coupling system to:
read a first copy of a primary data set in a primary memory location;
store the first copy in a first memory location;
set a first validity flag to indicate that the first copy is valid;
read a second copy of the primary data set in the primary memory location;
store the second copy in a second memory location;
set a second validity flag to indicate that the second copy is valid;
modify the first copy;
set the second validity flag to indicate that the second copy is invalid after modifying the first copy;
replace the primary data set with the modified first copy after the modifying of the first copy and before the setting of the second validity flag to indicate that the second copy is invalid;
replace the second copy with the primary data set after the setting of the second validity flag to indicate that the second copy is invalid; and
set the second validity flag to indicate that the second copy is valid after replacing the second copy with the primary data set;
create a first index corresponding to the first copy, wherein the first index is stored in a fourth memory location, wherein the first index is created after reading the first copy from the primary data set; and
create a second index corresponding to the second copy, wherein the second index is stored in the fourth memory location, wherein the second index is created after reading the second copy from the primary data set.

20. A computer readable medium comprising program instructions, wherein the program instructions are executable by a machine to implement:
reading a first copy of a primary data set in a primary memory location;
storing the first copy in a first memory location;
setting a first validity flag to indicate that the first copy is valid;
reading a second copy of the primary data set in the primary memory location;
storing the second copy in a second memory location;
setting a second validity flag to indicate that the second copy is valid;
modifying the first copy;
setting the second validity flag to indicate that the second copy is invalid after modifying the first copy;
replacing the primary data set with the modified first copy after the modifying of the first copy and before the setting of the second validity flag to indicate that the second copy is invalid;
replacing the second copy with the primary data set after the setting of the second validity flag to indicate that the second copy is invalid; and
setting the second validity flag to indicate that the second copy is valid after replacing the second copy with the primary data set;
creating a first index corresponding to the first copy, wherein the first index is stored in a fourth memory location, wherein the first index is created after reading the first copy from the primary data set; and
creating a second index corresponding to the second copy, wherein the second index is stored in the fourth memory location, wherein the second index is created after reading the second copy from the primary data set.

* * * * *